United States Patent [19]

Quellhorst

[11] Patent Number: 5,379,594
[45] Date of Patent: Jan. 10, 1995

[54] LIFT TRUCK WITH NOISE ATTENUATED HYDRAULIC CIRCUIT

[75] Inventor: Timothy S. Quellhorst, New Bremen, Ohio

[73] Assignee: Crown Equipment Corporation, New Bremen, Ohio

[21] Appl. No.: 863,954

[22] Filed: Apr. 6, 1992

[51] Int. Cl.⁶ .................. F16D 31/02; B64D 33/02
[52] U.S. Cl. .................... 60/469; 181/214; 248/638
[58] Field of Search .............. 417/312, 540; 60/469; 181/214, 212; 248/638, 634; 91/532, 518

[56] References Cited

U.S. PATENT DOCUMENTS

| | | | |
|---|---|---|---|
| 2,399,756 | 5/1946 | Mott . | |
| 3,137,138 | 6/1964 | Kalle | 60/469 |
| 3,543,646 | 12/1970 | Iisima | 91/532 X |
| 3,587,784 | 6/1971 | Tait | 91/532 X |
| 3,880,252 | 4/1975 | Mucka . | |
| 4,063,824 | 12/1977 | Baker et al. | 417/312 X |
| 4,067,195 | 1/1978 | Malecha | 60/469 |
| 4,068,987 | 1/1978 | Crooks . | |
| 4,184,564 | 1/1980 | Trainor . | |
| 4,988,069 | 1/1991 | D'Silva | 248/638 X |
| 5,036,662 | 8/1991 | Knowlton | 417/540 X |
| 5,040,953 | 8/1991 | Tinsler | 248/638 X |

FOREIGN PATENT DOCUMENTS

| | | | |
|---|---|---|---|
| 0155368 | 12/1979 | Japan | 417/312 |
| 1186826 | 10/1985 | U.S.S.R. | 417/540 |

OTHER PUBLICATIONS

Fluid Kinetics–Model AFC Hydraulic Acoustic Filter
National Advisory Committee for Aeronautics Report 1192, 1954.

Primary Examiner—John T. Kwon
Assistant Examiner—Hoang Nguyen
Attorney, Agent, or Firm—Thompson, Hine & Flory

[57] ABSTRACT

A lift truck having a hydraulic circuit with a muffler for reducing noise created by the hydraulic pump and motor assembly. The muffler includes a cylindrical body and first and second end caps which define an expansion volume which reduces the magnitude of pressure pulsations generated by the pump, thereby reducing noise. In one embodiment, the muffler includes mounting pads, located on the muffler body, for attaching the muffler to the truck frame, and a flexible hose interconnects the muffler and pump.

9 Claims, 3 Drawing Sheets

5,379,594

LIFT TRUCK WITH NOISE ATTENUATED HYDRAULIC CIRCUIT

BACKGROUND OF THE INVENTION

The present invention relates to lift truck vehicles having a powered hydraulic circuit.

In a typical lift truck vehicle, the load handling mechanisms and steering mechanisms are hydraulically operated. Present hydraulic systems incorporated on such lift trucks are powered by a pump or pumps that circulate hydraulic fluid through one or more hydraulic circuits that include a cylinder. An undesirable level of noise can be produced during the operation of these hydraulic systems. This noise is the combined result of three different noise generation mechanisms, typically referred to as noise sources. The first source is airborne noise which directly radiates from the pump. The second source is structureborne noise which occurs when the mechanical vibration of the pump causes other structural components on the lift truck to vibrate and radiate noise. The third source is fluidborne noise caused by pressure pulsations in the hydraulic fluid which are generated when the pump converts low pressure fluid to high pressure fluid. As with structureborne noise, these pressure pulsations cause other structural components, such as a hydraulic line connected to a structural panel, to vibrate and radiate noise. These three sources of noise all originate at the hydraulic pump.

The most common type of hydraulic pump used on lift trucks is a gear pump. External gear pumps are normally used, although internal gear pumps have been utilized. While internal gear pumps are two to three times more expensive and less efficient than external gear pumps, they do generate lower pressure pulsations, and therefore less noise. Because of the drawbacks associated with internal gear pumps, that being greater expense and less efficiency, external gear pumps are the preferred design.

Recent advances in external gear pumps—such as split gears, pressure trapping, and higher quality gears—have been developed with the intent being to lower the magnitude of the pressure pulsations and thereby reduce the amount of noise. Even with the development of advanced external gear designs, forklift truck hydraulic systems still produce an undesirable level of noise.

The absolute minimum noise level that can be achieved on a forklift truck would be that generated as airborne noise by the pump. Totally eliminating the structure and fluidborne noise sources is virtually impossible. However, reducing these generated noises to a level that is substantially below the pump airborne noise level will result in the minimum overall sound pressure for the operator of a lift truck.

Accordingly, the need exists for an apparatus and method for the reduction of structureborne and fluidborne hydraulic circuit noise generated by the hydraulic pump of a forklift truck.

SUMMARY OF THE INVENTION

The present invention provides a method and apparatus for reducing the structure and fluidborne noise created in the hydraulic circuit of a forklift truck by the hydraulic pump. Fluidborne noise is reduced by placing an inline expansion volume muffler in the hydraulic circuit after the discharge port of the hydraulic pump. Structureborne noise is reduced by using flexible, resilient hydraulic fluid lines between the pump and the muffler and between the muffler and the rest of the hydraulic circuit, as well as resilient isolation mounts between the muffler and the truck's structure. The motor used to support and power the gear pump preferably is attached to the truck frame with resilient isolation mounts.

The muffler reduces fluidborne noise by damping the pressure pulsations generated by the pump. The pressure pulsations are reduced by allowing the hydraulic fluid to expand when entering the muffler chamber having a larger cross-sectional area than the hydraulic fluid lines. While the invention is described with reference to an external gear pump, it should be understood that a hydraulic system driven by any type of pump which produces pressure pulsations in the pump fluid outlet will benefit by the use of the invention.

The expansion muffler comprises a cylindrical outer body enclosed by end caps. A threaded port is located in each end cap for permitting the entry and exit of hydraulic fluid into and out of the cylindrical body and for the attachment of hydraulic lines. Depending upon the type of hydraulic pump and the configuration of the lift truck, the length and cross-sectional area of the cylindrical body can be varied. Shapes other than cylindrical will also produce similar results and do not depart from the scope of the invention. Optional mounting pads are located on the outer surface of the body for securing the muffler to the truck chassis.

Accordingly, it is an object of the present invention to provide a lift truck with a hydraulic circuit to power lifting or other devices on the truck in which the structure and fluidborne portions of the overall hydraulic noise are reduced to levels such that the impact of such portions is negligible; a hydraulic circuit in which the impact of pressure pulsations on the circuit are reduced; and a hydraulic circuit in which noise is substantially reduced at a relatively low cost.

These and other features and advantages of the present invention will be better understood by reference to the following detailed description, the accompanying drawings and the appended claims.

DETAILED DESCRIPTION

Figure 1:
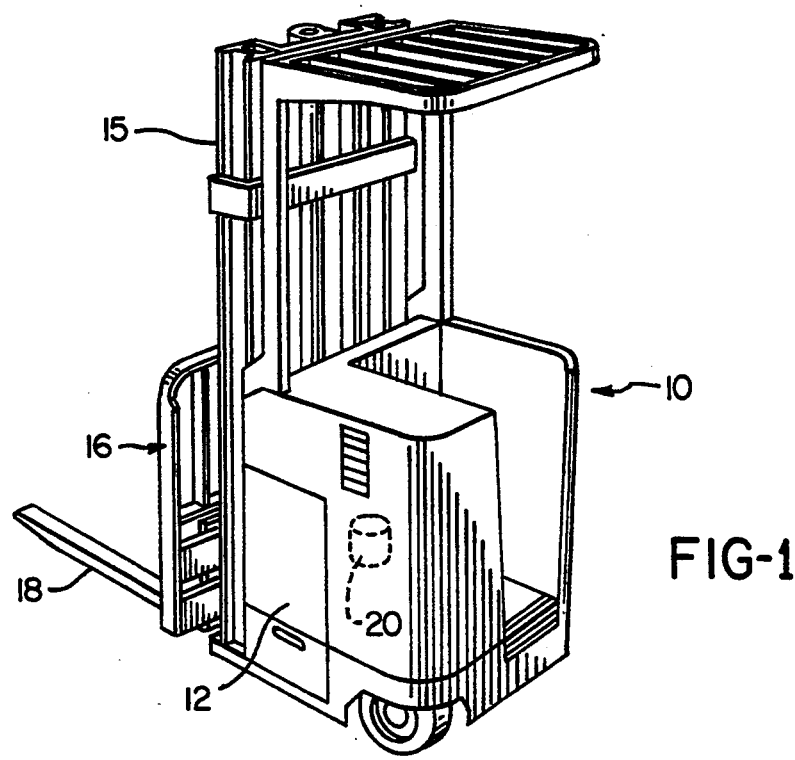
FIG. 1 is a perspective view of a battery powered lift truck including a hydraulic lifting mechanism operated by a hydraulic circuit of the present invention.

A typical forklift truck incorporating the present invention, generally designated 10, is shown in FIG. 1. The lift truck 10 is electrically powered by a battery 12. A mast 15 is mounted on the front of the lift truck 10 and supports a lifting mechanism, generally designated 16, which is hydraulically operated. The lifting mechanism 16 includes a fork assembly 18 for engaging a load to be lifted.

Figure 3:
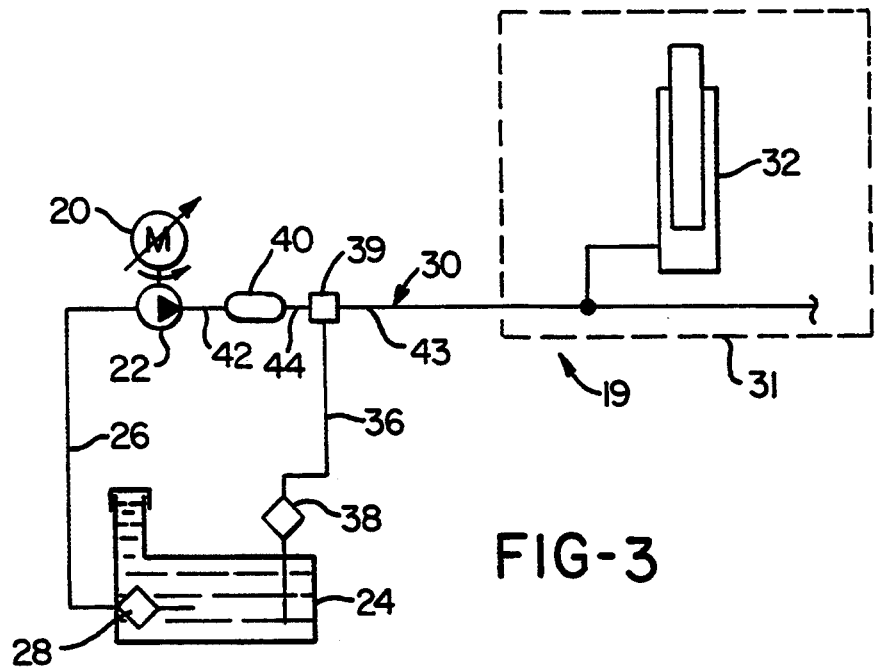
FIG. 3 is a schematic diagram of the hydraulic circuit used in the lift truck of FIG. 1.

The lifting mechanism 16 is actuated by a hydraulic circuit shown in FIG. 3, generally designated 19. An electric motor 20, powered by battery 12 (see FIG. 1), drives a gear pump 22, preferably an external gear pump, for circulating hydraulic fluid from a reservoir 24 through the hydraulic circuit 19. The motor 20 and pump 22 preferably are mounted on the lift truck 10 by vibration isolation mounts (see FIG. 6). The pump 22 draws fluid from the reservoir 24 through supply line 26 having filter 28, and pumps the fluid under pressure through feed line 30 to the cylinders controlling the lifting mechanism 16 and other hydraulic components of the lift truck, collectively designated 31 and represented by cylinder 32. It is to be understood that additional hydraulically-operated components may be added to the circuit 19, depending upon the type of lift truck embodying the invention, and not depart from the scope of the invention. Return line 36 receives fluid from lift assembly 31 and conveys it back to the reservoir 24 and through filter 38. A manual control value 39 diverts the fluid to or from lift assembly 31.

Figure 2:
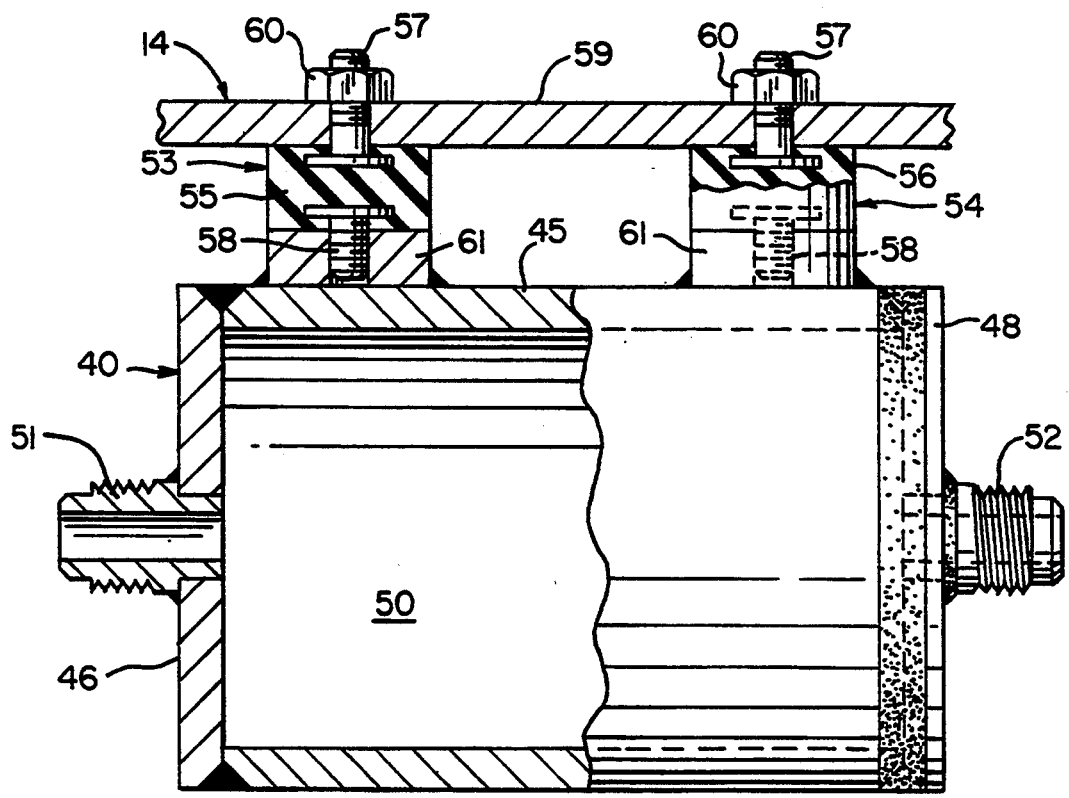
FIG. 2 is a side elevation in partial section of an inline expansion muffler used in the hydraulic circuit of the lift truck of FIG. 1.

Feed line 30 includes a muffler 40 which is connected to the pump 22 by a flexible resilient line 42 and to the lift assembly 31 by line 43 which includes valve 39. A flexible resilient line 44 interconnects muffler 40 with valve 39. As shown in FIG. 2, the muffler 40 is an in-line expansion muffler having a hollow cylindrical body 45 with caps 46, 48 attached to its ends by welding. The cylindrical body 45 and end caps 46, 48 form a hollow expansion chamber 50 within the muffler 40. End caps 46, 48 include first and second threaded ports 51, 52, respectively. Ports 51, 52 are connected to lines 42, 44, respectively, of feed line 30 (see FIG. 3) to permit the entry and exit of hydraulic fluid into and out of the expansion chamber 50.

Isolation mounts 53, 54 include mounting pads 55, 56 having bolts 57, 58 molded integrally with the pads. Bolts 57 attach the muffler 40 to the frame 59 of the truck chassis 14 by nuts 60 and bolts 58 are threaded into bosses 61 on the body 45. Isolation mounts 53, 54 reduce structureborne noise generated by the pump and transmitted through the muffler 40.

The noise level generated by a hydraulic circuit is measured in terms of decibels and is known as sound pressure. Sound pressure is dominated by the pumping frequency and its first few harmonics; that is, the majority of the noise heard by the operator of the forklift vehicle is that produced by the first few harmonics of the pump. The decibel level varies with the speed of the motor but is not directly proportional thereto. The inconsistent variation in the total sound pressure of the hydraulic circuit is a result of fluidborne and structureborne noise. Consequently, by reducing the fluidborne and structureborne noise components to a level that is below the airborne pump noise level, the most acceptable sound pressure level can be achieved.

Two critical design parameters for the expansion muffler 40 are the length of the muffler and the ratio of the cross sectional area of the muffler to the cross sectional area of the hydraulic lines 42, 44. The inlet and outlet port diameters of the muffler 40 are determined by the maximum flow rate of the oil passing through the hydraulic system 19. Too small a diameter will cause excessive pressure losses. The line diameter is determined by industry standard. As the inside diameter of the muffler increases, the area ratio of the cross sectional area of the muffler to the cross sectional area of the hydraulic line increases. As this ratio increases, the amount of attenuation at any frequency also increases. Therefore, the larger the diameter of the expansion chamber, the more effective the muffler will be.

However, there is a design limitation upon the expansion chamber diameter. The muffler will not work at a frequency where waves other than plane waves can exist. This is known as the critical frequency. Since it is the objective of the invention to reduce noises that can be heard, the critical frequency should not be less than the sixth harmonic of the pumping frequency. The optimal diameter of the expansion chamber is a factor of the speed of sound in hydraulic fluid divided by the critical frequency.

The speed of sound for the typical hydraulic fluid (Mobil DTE Grade 24 oil at 150° F.) used in forklift truck hydraulic systems is 4400 feet per second (1341 m/s). Applicant has found that the optimal diameter of the expansion chamber should not exceed 2.44 times the optimal length ($L_e$). Diameters larger than this may be possible only if the pressure pulsations being muffled have a low frequency spectrum.

The other important design feature of the muffler is its length. The key to this design is the frequency spectrum that typical gear pumps generate. The design frequency of the muffler is the frequency where maximum attenuation occurs.

The optimum length of the expansion chamber is equal to one-fourth of the wavelength at the design frequency, wherein the wavelength is equal to the speed of sound in the hydraulic fluid divided by the design frequency. The design frequency should be three times the pumping frequency since the gear pumps generate very little energy above five times the pumping frequency and therefore sufficient attenuation is provided at all the important frequencies. The pumping frequency is a factor of the number of teeth per gear of the gear pump and the speed of the motor. Consequently, the optimal muffler length is also a function of the motor RPM's and the number of gear teeth in the pump. The optimal muffler length ($L_e$) is determined from the following equation:

$$L_e \text{ (in.)} = \frac{264,000}{\text{(no. of teeth)(motor RPM)}}$$

In operation, the motor 20 drives the gear pump 22 which circulates the hydraulic fluid through the system 19 and creates pressure pulsations in the fluid as it passes through the pump. The hydraulic fluid flows from the pump 22 into the expansion muffler 40 which reduces the pressure pulsations, effectively muffling the fluidborne noise created by the pump. After the hydraulic fluid exits the muffler 40, it is circulated to the lifting cylinder 32 of the lifting assembly 31 through hydraulic fluid line 43. To lower mechanism 16, the fluid is directed from cylinder 32 by valve 39 to the fluid reservoir 24 through return line 36.

Figure 4:
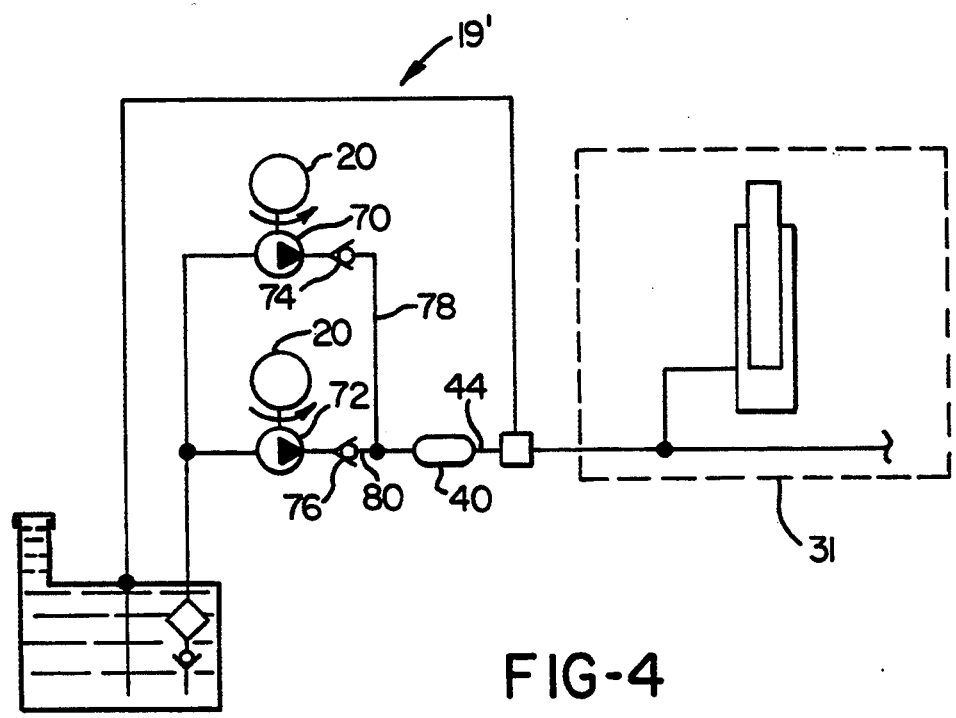
FIG. 4 is a schematic diagram of an alternative embodiment of the hydraulic circuit of the present invention FIG. 3.

FIG. 4 illustrates an alternate embodiment of the invention in which hydraulic circuit 19' is powered by two gear pumps 70, 72, each driven by motor 20. In circuit 19', the muffler 40 is placed immediately after check valves 74, 76 adjacent the exit ports of the pumps 70, 72 and is connected to the valves by lines 78, 80 which are flexible resilient lines. Muffler 40 is interconnected with control valve 39 by flexible resilient line 44.

In operation, hydraulic circuit 19' operates identically to hydraulic circuit 19 (see FIG. 3) except that two pumps and motors are utilized instead of one.

Figure 5:
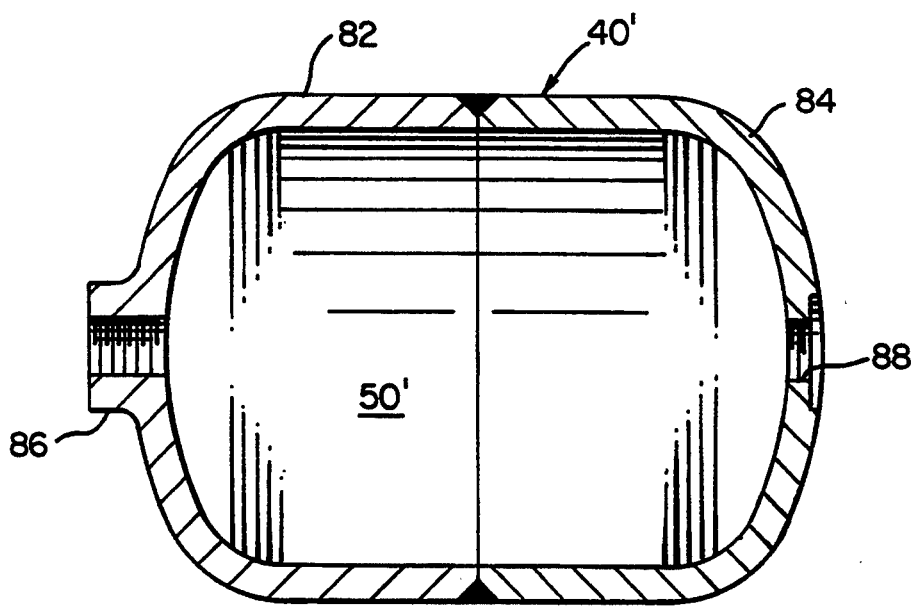
FIG. 5 is an alternate embodiment of a muffler incorporated in the present invention.

As shown in FIG. 5, an alternate embodiment of muffler 40' includes two generally cup-shaped halves 82, 84 welded together to form chamber 50'. Half 82 includes an alternate design threaded boss 86 and half 84 includes an alternate design threaded orifice 88 for connection to lines 42, 44, respectively, of circuit 19 (see FIG. 3). Line 44 preferably is a steel line with a supporting rubber grommet. Muffler 40' is designed to be supported entirely on line 44 and not be mounted directly on the frame, thereby avoiding transmission of vibrations to the frame at that point.

Figure 6:
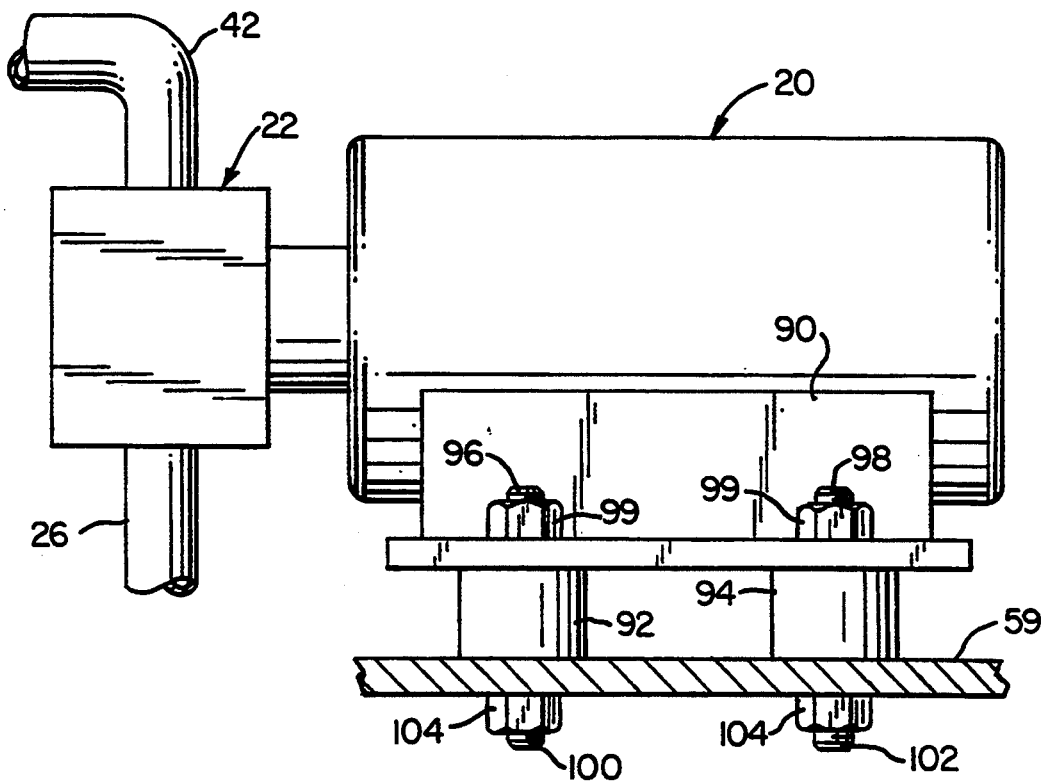
FIG. 6 is a schematic side elevation of the motor and pump of the circuit of the present invention.

As shown in FIG. 6, in the lift truck 10 of FIG. 1, the motor 20 includes a mounting bracket 90 which is attached to the frame 59 by vibration isolation mounts 92, 94. Mounts 92, 94 are identical in construction to mounts 53, 54 which attach muffler 40 to the frame 59 (see FIG. 2) and include bolts 96, 98 attached to bracket 90 by nuts 99, and bolts 100, 102 attached to the frame by nuts 104. It is within the scope of the invention to provide other types of vibration isolation mechanisms, such as springs. Alternately, if structureborne vibration generated by the motor 20 is not significant, the motor may be mounted without vibration isolation mounts.

The preceding description has been presented with reference to a presently preferred embodiment to the invention, as well as an alternative embodiment as shown in the drawings. Workers skilled in the art and technology to which this invention pertains will appreciate that alterations and changes in the described structure can be practiced without departing from the spirit, principles and scope of this invention.

What is claimed is:

1. In a lift truck having a hydraulic driven mechanism, a noise-attenuated hydraulic circuit comprising:
    a source of hydraulic fluid;
    a hydraulic pump;
    means for actuating said mechanism;
    a fluid supply line interconnecting said pump and said actuating means;
    an in-line expansion muffler having a generally cylindrical body with an inlet, an outlet and a diameter greater than said supply line, said muffler being mounted on said supply line between said pump and said actuating means such that said inlet and said outlet are connected to said supply line; and
    means for isolating said muffler from said truck and said supply line, said isolating means including a resilient mount attaching said body to said truck, a first flexible, resilient line interconnecting said inlet with said supply line between said muffler and said pump, and a second flexible, resilient line interconnecting said outlet with said supply line between said muffler and said actuating means, whereby said muffler is completely isolated from said truck, and structureborne noise generated by said pump is minimized.

2. The lift truck of claim 1 wherein said muffler includes a cylindrical central portion, a first end cap having said inlet, and a second end cap having said outlet, said central portion and end caps forming a chamber for receiving hydraulic fluid from said supply line.

3. The lift truck of claim 1 wherein said resilient mount includes a mounting pad made of a resilient material having bolts molded integrally therein and protruding therefrom to attach to said muffler and said truck; said bolts being spaced from each other such that a portion of resilient material separates said bolts from each other.

4. The lift truck of claim 1 wherein said muffler is mounted on said supply line adjacent to said pump.

5. The lift truck of claim 1 wherein said lift truck includes a battery for powering said truck, and electric motor means for driving said pump.

6. The lift truck of claim 1 wherein said pump is an external gear pump.

7. The lift truck of claim 1 wherein said muffler has an internal diameter no greater than 2.44 times an internal length of said muffler.

8. The lift truck of claim 1 wherein said muffler has a length ($L_e$) determined by the equation:

$$L_e \text{ (in.)} = \frac{264{,}000}{\text{(no. of teeth per gear)(motor RPM)}}.$$

9. The lift truck of claim 1 further comprising a motor connected to drive said pump; said motor including vibration isolation mounts attaching said motor to said truck.

* * * * *